(12) United States Patent
Clarke et al.

(10) Patent No.: US 7,590,275 B2
(45) Date of Patent: Sep. 15, 2009

(54) METHOD AND SYSTEM FOR RECOGNIZING A CANDIDATE CHARACTER IN A CAPTURED IMAGE

(75) Inventors: Ian Clarke, Toronto (CA); Hui Zhou, Toronto (CA); Jeffrey Matthew Achong, Brampton (CA)

(73) Assignee: Seiko Epson Corporation, Tokyo (JP)

( * ) Notice: Subject to any disclaimer, the term of this patent is extended or adjusted under 35 U.S.C. 154(b) by 547 days.

(21) Appl. No.: 10/926,658

(22) Filed: Aug. 26, 2004

(65) Prior Publication Data

US 2006/0045322 A1 Mar. 2, 2006

(51) Int. Cl.
*G06K 9/00* (2006.01)

(52) U.S. Cl. .......................... 382/137; 705/45
(58) Field of Classification Search ................. 382/137; 705/45
See application file for complete search history.

(56) References Cited

U.S. PATENT DOCUMENTS

| | | | |
|---|---|---|---|
| 3,764,978 A | 10/1973 | Tyburski et al. | |
| 3,876,981 A | 4/1975 | Welch | |
| 3,949,363 A | 4/1976 | Holm | |
| 4,315,246 A | 2/1982 | Milford | |
| 4,396,902 A | 8/1983 | Warthan et al. | |
| RE31,692 E | 10/1984 | Tyburski et al. | |
| 4,555,617 A | 11/1985 | Brooks et al. | |
| 4,564,752 A | 1/1986 | Lepic et al. | |
| 5,077,805 A * | 12/1991 | Tan | 382/137 |
| 5,272,766 A * | 12/1993 | Higgins et al. | 382/161 |
| 5,563,958 A * | 10/1996 | Higgins et al. | 382/183 |
| 5,754,673 A | 5/1998 | Brooks et al. | |
| 5,784,485 A * | 7/1998 | Xu et al. | 382/156 |
| 5,852,676 A * | 12/1998 | Lazar | 382/173 |
| 5,963,659 A | 10/1999 | Cahill et al. | |
| 6,181,837 B1 | 1/2001 | Cahill et al. | |
| 6,196,393 B1 | 3/2001 | Kruk, Jr. et al. | |
| 6,381,342 B2 | 4/2002 | Foley | |
| 6,408,084 B1 | 6/2002 | Foley | |
| 6,411,737 B2 * | 6/2002 | Wesolkowski et al. | 382/237 |
| 6,487,302 B2 | 11/2002 | Foley | |
| 6,504,946 B1 | 1/2003 | Rossignoli | |
| 2002/0037097 A1* | 3/2002 | Hoyos et al. | 382/137 |
| 2002/0181805 A1 | 12/2002 | Loeb et al. | |
| 2004/0170328 A1* | 9/2004 | Ladwig et al. | 382/217 |

* cited by examiner

*Primary Examiner*—Brian P Werner
*Assistant Examiner*—Katrina Fujita (57) ABSTRACT

A system and method of recognizing characters in a captured image, includes selecting a portion of the image encompassing a string of characters in the captured image to be recognized. The selected portion is examined to identify segments that potentially include the characters of the string. During the examining multiple tests on pixels in the selected portion are performed. The identified segments are then examined to recognize the string of characters.

29 Claims, 8 Drawing Sheets

METHOD AND SYSTEM FOR RECOGNIZING A CANDIDATE CHARACTER IN A CAPTURED IMAGE

FIELD OF THE INVENTION

The present invention relates generally to symbol recognition and more particularly, to a method and system for recognizing a candidate character in a captured image.

BACKGROUND OF THE INVENTION

Marking documents with machine-readable characters to facilitate automatic document recognition using character recognition systems is well known in the art. For example, cheques issued by banks and other financial institutions have pre-printed account identification information thereon that is intended to be automatically read when cheques are processed by a cheque-processing system. The account identification information is in the form a character string, typically thirty (30) characters in length, adjacent to and running parallel to the bottom edge of the cheque. To enhance readability, the characters in account identification character strings are often printed according to the "E13B" font specification developed by the American Bankers Association. The use of E13B characters in conjunction with specifications, such as for example Standard 006: *Standards and Specifications for MICR Encoded Documents,* 2002, published by the Canadian Payments Association, that govern the manner by which information is to be laid-out on cheques, have improved the ability of cheque-processing systems to recognize correctly account identification information pre-printed on cheques.

Although the use of the aforementioned E13B characters and cheque layout specifications has improved account identification information recognition in cheque processing systems, advancements to improve accuracy and reduce the need for manual intervention in cheque processing systems and indeed, in character recognition systems in general, are continually being sought.

As a result, many systems to recognize automatically characters printed on documents and reduce the need to handle manually documents have been considered. For example, U.S. Pat. No. 4,564,752 to Lepic et al. discloses a sorting machine including a character recognition system to read information on documents fed to the sorting machine. When the sorting machine receives a document that includes information that cannot be read by the character recognition system, the document is diverted and an image of the unreadable information on the document is captured. The captured image of the unreadable information is then presented to an operator allowing the operator to view the information and manually code the information into the sorting machine. The diverted document is then reinserted and sorted based on the manual coding provided by the operator.

U.S. Pat. No. 3,764,978 to Tyburski et al. discloses a system for recognizing characters including both optical and magnetic readers to recognize characters printed on cheques using magnetic black ink. During processing both optical and magnetic images of the printed characters are acquired. By acquiring both optical and magnetic images, poor image quality in one of the images resulting from marks, such as stains, can be overcome by relying on the other image during character recognition.

U.S. Pat. No. 4,315,246 to Milford also discloses a character recognition system including both optical and magnetic readers for reading and identifying characters printed on cheques using magnetic ink. The character recognition system compares strings of characters identified by the optical and magnetic readers to validate read character strings.

Neural networks have also been employed in cheque-processing systems to recognize characters in captured cheque images. In cheque-processing systems employing such neural networks, the neural networks are trained by manually associating collections of captured character images with the corresponding characters.

As will be appreciated from the above discussion, various character recognition systems have been considered. Unfortunately, known character recognition systems such as those noted above suffer disadvantages and as a result, improvements are desired. It has been found that when capturing an image of a document including characters to be recognized, noise in the captured image negatively impacts the ability of the character recognition systems to recognize the characters. Such noise may take the form of dark specks or blotches in or overlapping a background around a character. Additionally, the noise may be a missing part or parts of a character, which may occur as a result of a less than ideal application of ink to the document surface or a result of surface wear.

It is therefore an object of the present invention to provide a novel method and system for recognizing a candidate character in a captured image.

SUMMARY OF THE INVENTION

Accordingly, in one aspect of the present invention, there is provided a method of identifying a candidate character in a captured image. The method comprises comparing a segment of the captured image with at least one character template image. Each character template image includes features associated with a respective character to be recognized. The segment is identified as including a candidate character when the segment includes image information corresponding to the character template image.

In one embodiment, the segment is compared with a plurality of character template images and the features in each character template image include contours of the respective character. The contours include pixels forming the outline of the respective character and background pixels adjacent to the outline pixels.

Each character template image has an associated coefficient map assigning coefficients to each pixel in the character template image. Coefficients corresponding to pixels of the contour are weighted differently than other pixels in the character template image. During the comparing, pixels of the segment are compared with corresponding pixels of each character template image and a correlation result is generated using the coefficients. The correlation result represents the degree of likelihood the segment includes a candidate character represented by the character template image. Each correlation result satisfying a threshold is used to identify the segment as potentially including a candidate character represented by the character template image associated with the coefficients that are used to generate that correlation result.

In one embodiment, the character is an E13B character and the captured image is an image of a cheque. In this case, the segment encompasses an E13B character forming part of an account identification E13B character string on the cheque.

According to another aspect of the present invention, there is provided a method for recognizing characters in a captured image. The method comprises selecting a portion of the image encompassing a string of characters in the captured image to be recognized. The selected portion is examined to identify segments that potentially include the characters of the string. During the examining multiple tests on pixels in the selected portion are performed. The identified segments are then examined to recognize the string of characters.

During examining of the selected portion, segments of the selected portion including pixel clusters corresponding generally in size to the known size of characters in the string are firstly identified. Each firstly identified segment is extracted and then erased from the selected portion. Extracted segments are examined to recognize the string of characters. Following erasing of the firstly identified segments from the selected portion, a sliding window pixel comparison of the selected portion is carried out to identify additional segments of the selected portion that potentially include characters of the string. Prior to the sliding pixel comparison, proximal pixel clusters are grouped with each group of pixel clusters being compared to character template images representing characters to be recognized to identify pixel clusters within the groups representing the characters.

Prior to examining of the selected portion, the selected portion is aligned. During the aligning, special characters in the string are identified and used to align the selected portion. In particular, the cross-correlation between the selected portion and a special character template image representing the special characters is used to generate values corresponding to the special characters. The values are used to rotate and align the selected portion.

According to yet another aspect of the present invention, there is provided a method of recognizing characters in a captured image. The method comprises performing character recognition using a neural network by comparing a segment of the image encompassing the character to be recognized with a plurality of character template images representing recognizable characters. When the character encompassed by the image segment corresponds to one of the character template image, the character is recognized as that represented by the one character template image. When the character encompassed by the image segment corresponds to a plurality of the character template images, a correlation between the image segment and each character template image of the plurality is used to recognize the character as that represented by one character template image of the plurality.

The correlation representing the character template image of the plurality that is the most likely to represent the character encompassed by the image segment is used. The character is not recognized when the correlations are below a threshold strength.

According to still yet another aspect of the present invention, there is provided a system for identifying and recognizing a character in a captured image. The system comprises a processing unit for selecting a portion of the image encompassing a string of characters in the captured image to be recognized and examining the selected portion to identify segments including the characters of the string. Identified segments include information resembling contours of characters to be recognized. A neural network examines the identified segments to recognize the string of characters.

The present invention provides advantages in that since the character template images include features, such as for example contours, of the characters to be recognized, noise in captured images has less impact in determining the presence of a candidate character in the captured images. Also, when a candidate character in a captured image cannot be matched to a single character with a desired level of confidence, the use of correlations allows for the candidate character in some cases to be matched to a single character thereby to improve the character recognition process.

BRIEF DESCRIPTION OF THE DRAWINGS

Embodiments of the present invention will now be described, more fully, with reference to the accompanying drawings in which.

DETAILED DESCRIPTION OF THE EMBODIMENTS

Figure 1:
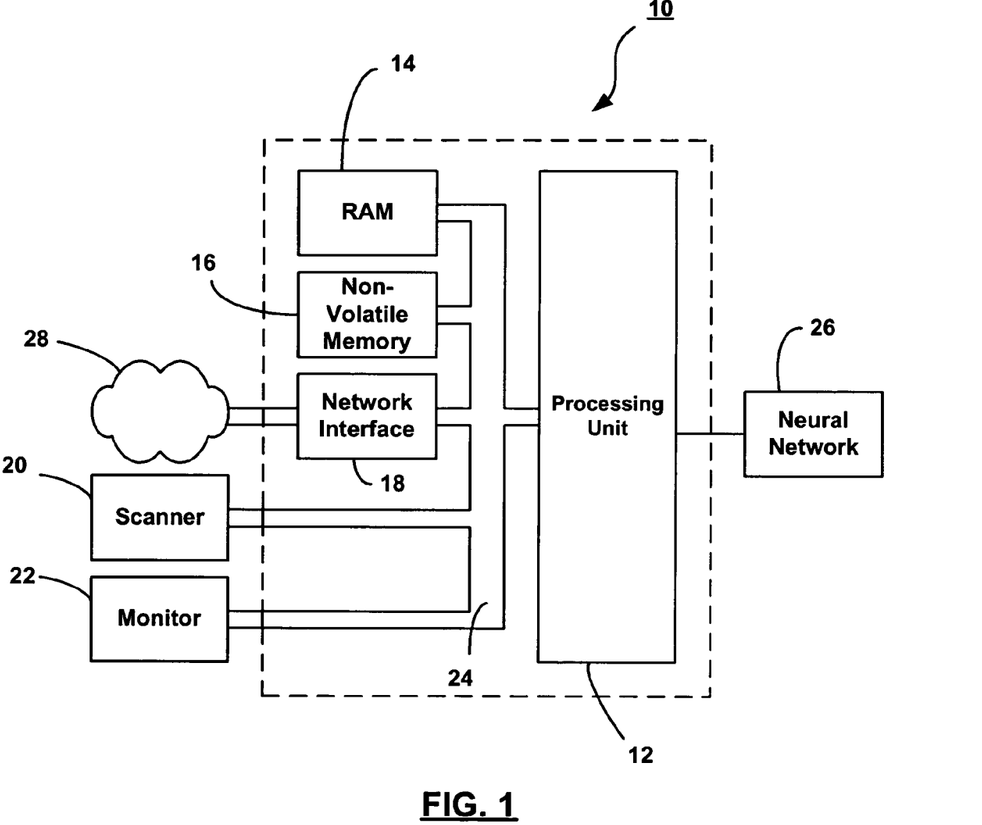
FIG. 1 is a schematic block diagram of a character recognition system for recognizing candidate characters in a captured image in accordance with the present invention.

Turning now to FIG. 1, a character recognition system for use in a cheque-processing system is shown and is generally identified by reference numeral 10. In this embodiment, character recognition system 10 is designed to read and recognize account identification information pre-printed on cheques adjacent to and running generally parallel to the bottom edge of the cheques. As can be seen, character recognition system 10 comprises a processing unit 12 including an Intel Pentium III 1 GHz processor 12, that communicates with random access memory (RAM) 14, non-volatile memory 16, a network interface 18, a 200×200 DPI greyscale scanner 20 based on TM-H6000II and a monitor 22 over a local bus 24. The processing unit 12 also communicates with a neural network 26 that is trained to recognize E13B characters in captured images.

The processing unit 12 executes character recognition software to enable the account identification information pre-printed on cheques to be located and recognized as will be described. The non-volatile memory 16 stores the operating system and character recognition software used by the processing unit 12. The non-volatile memory 16 also stores E13B character template images that are used by the processing unit 12 during E13B character detection. The network interface 18 communicates with one or more information networks identified generally by reference numeral 28.

Scanner 20 scans cheques fed to the character recognition system 10 thereby to capture images of the cheques. In this embodiment, cheques to be scanned are fed to the scanner 20 in a portrait orientation. As a result, the account identification E13B character string 38 on each scanned cheque is in a vertical orientation in each captured cheque image. Network interface 18 allows cheque images to be uploaded from one or more information networks 28 and permits remote software maintenance.

The neural network 26 in the present embodiment is a computer system that is designed to "learn" the relationships between a set of previously-captured training images of E13B characters and the E13B character template images stored in the non-volatile memory 16. The training images in this embodiment are printed E13B character template images that have been subjected to various conditions such as wear, prior to scanning. The size of each training image is adjusted to be 19 by 24 pixels with a horizontal orientation, thereby to match the size and orientation of the E13B character template images. After the set of captured training images is provided to the neural network 26, a human operator manually associates each captured training image with its corresponding E13B character. The product of this learning process is a complex set of relationships mapped by the neural network 26. Once the learning process is complete, the neural network 26 is ready to analyze cheque images including candidate E13B characters in order to recognize the E13B characters in the cheque images.

Figure 2:
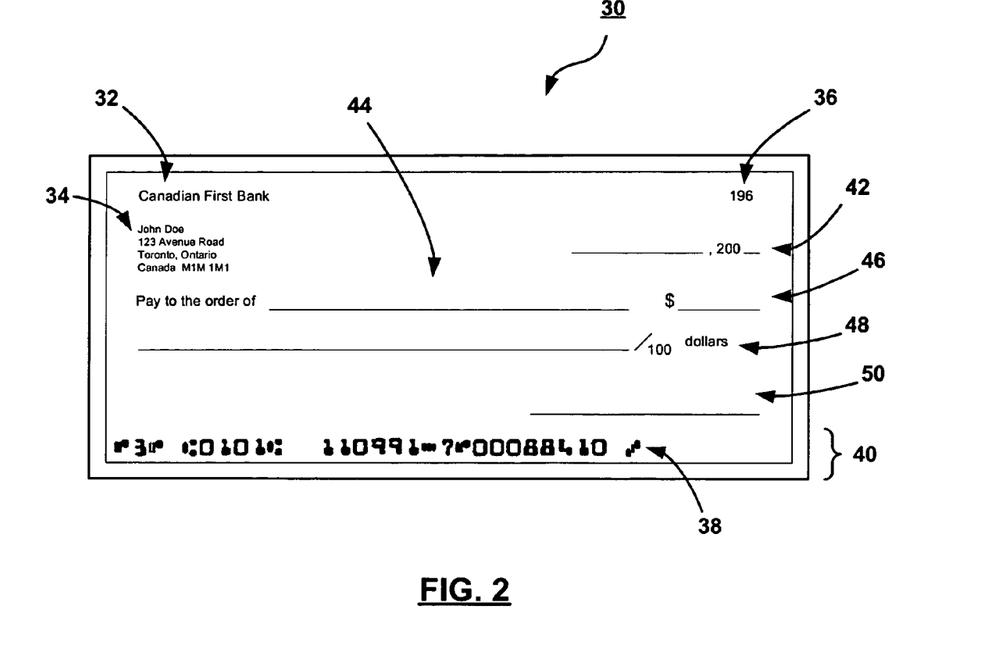
FIG. 2 is a front elevational view of a cheque having an account identification E13B character string printed thereon.

FIG. 2 shows a sample cheque 30 of the type to be read by the character recognition system 10. Cheque 30 has a number of pre-printed fields and fields to be manually completed. The pre-printed fields include a bank name field 32, an account-holder identification field 34, a cheque number 36 and an account identification E13B character string 38 generally contained in a border strip 40 positioned adjacent to and running generally parallel to the bottom edge of the cheque 30. Fields requiring manual completion include a date field 42, a payee field 44, a numeric amount field 46, a written amount field 48 and a signature line 50.

The account identification E13B character string 38 pre-printed on the cheque 30 includes a plurality of E13B characters one of which is designated as a special character. The special character is used as a marker in E13B character strings on cheques and must appear twice in an E13B character string at assigned locations along the E13B character string in order for the E13B character string to be considered valid. In addition to validating the E13B character string, the special characters allow the E13B character string to be located and assist in determining the orientation and size of the E13B character string as well as in detecting distortion in the E13B character string.

Figure 3:
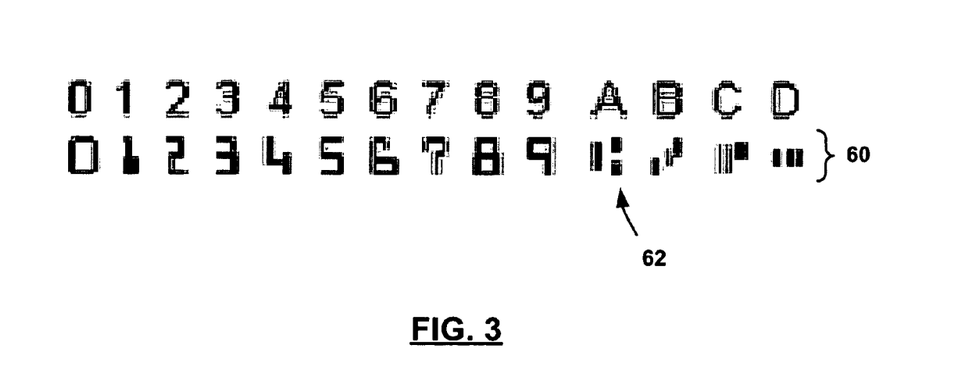
FIG. 3 shows a set of E13B characters and equivalent ASCII characters.

FIG. 3 shows the set 60 of E13B characters that can be used to make up an account identification E13B character string. As shown, the set 60 of E13B characters includes numbers corresponding to ASCII numerals 0 to 9 and four additional characters corresponding to ASCII letters A to D that allow for non-numeric information to be encoded. In this example, the E13B character representing the ASCII letter "A" is designated as the special character 62. The shapes of the E13B characters are designed to be easily recognized by both magnetic and optical character recognition systems and to allow each E13B character to be distinguished from other E13B characters. For example, the E13B character representing the ASCII numeral "1" has an exaggerated base, thus distinguishing it from the E13B character representing the ASCII numeral "7". Further, the E13B character representing the ASCII numeral "3" has a thick vertical line along the lower portion thereof, distinguishing it from the E13B character representing the ASCII numeral "8", which has two thick, laterally spaced vertical lines along its lower portion. The E13B characters have a fixed font size of approximately 8.4 points and a print size of eight characters per inch.

The general operation of the character recognition system 10 will now be described with particular reference to FIGS. 1 to 4. Upon power up, the processing unit 12 loads the operating system from the non-volatile memory 16. The processing unit 12 then loads the character recognition software and the E13B character template images from the non-volatile memory 16. Once loaded, the processing unit 12 executes the character recognition software placing the character recognition system 10 into a ready state.

Figure 4:
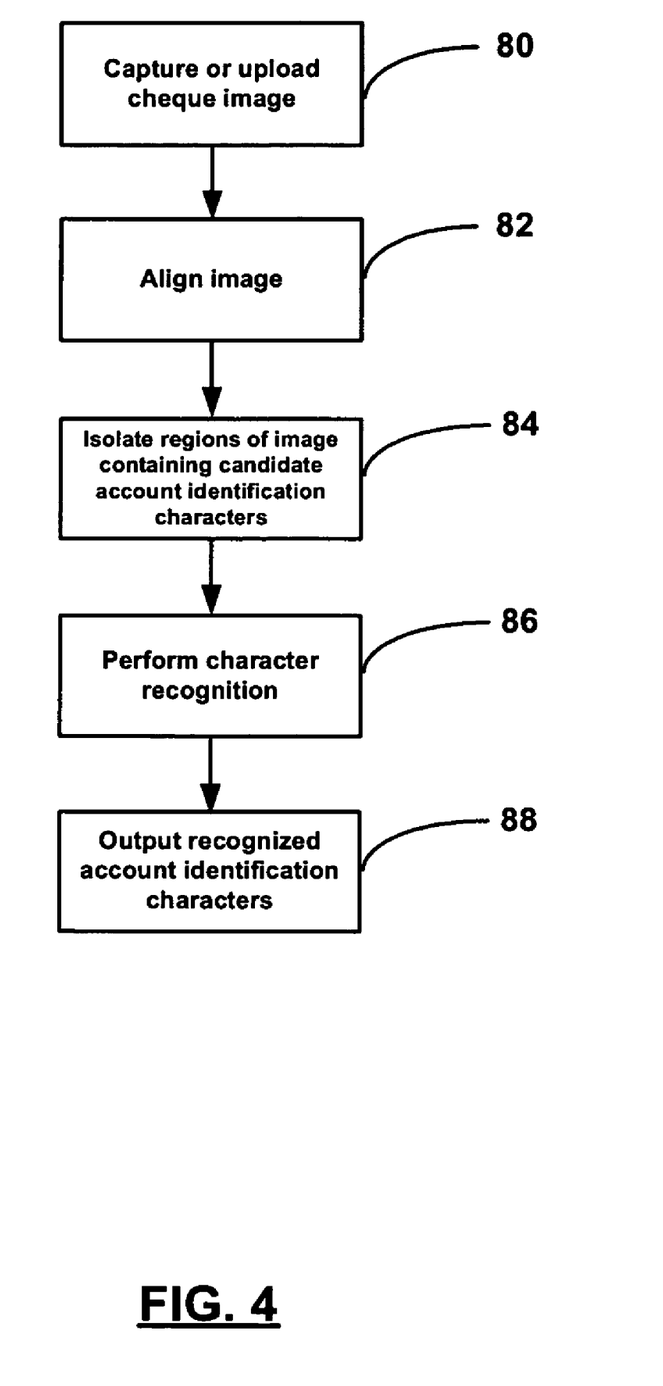
FIG. 4 is a flow chart showing the steps performed by the character recognition system of FIG. 1 in order to locate and recognize E13B characters in the account identification E13B character string printed on a cheque.

With the character recognition system 10 in the ready state, cheques to be processed can be fed to the character recognition system 10 for scanning or cheque images can be uploaded from other information networks 28 via the network interface 18 (step 80). As each cheque is fed into the character recognition system 10, the cheque is scanned by the scanner 20 thereby to capture an image of the scanned cheque. For each cheque image whether scanned or uploaded, the cheque image is aligned to position properly the account identification E13B character string 38 thereon (step 82). With the cheque image aligned, segment or regions of the cheque image containing candidate E13B characters forming the account identification E13B character string 38 are isolated and extracted (step 84). Character recognition is then performed in respect of each extracted candidate E13B character in order to recognize the E13B characters of the account identification E13B character string 38 (step 86). The recognized E13B characters of the account identification E13B character string 38 are then output (step 88).

Figure 5:
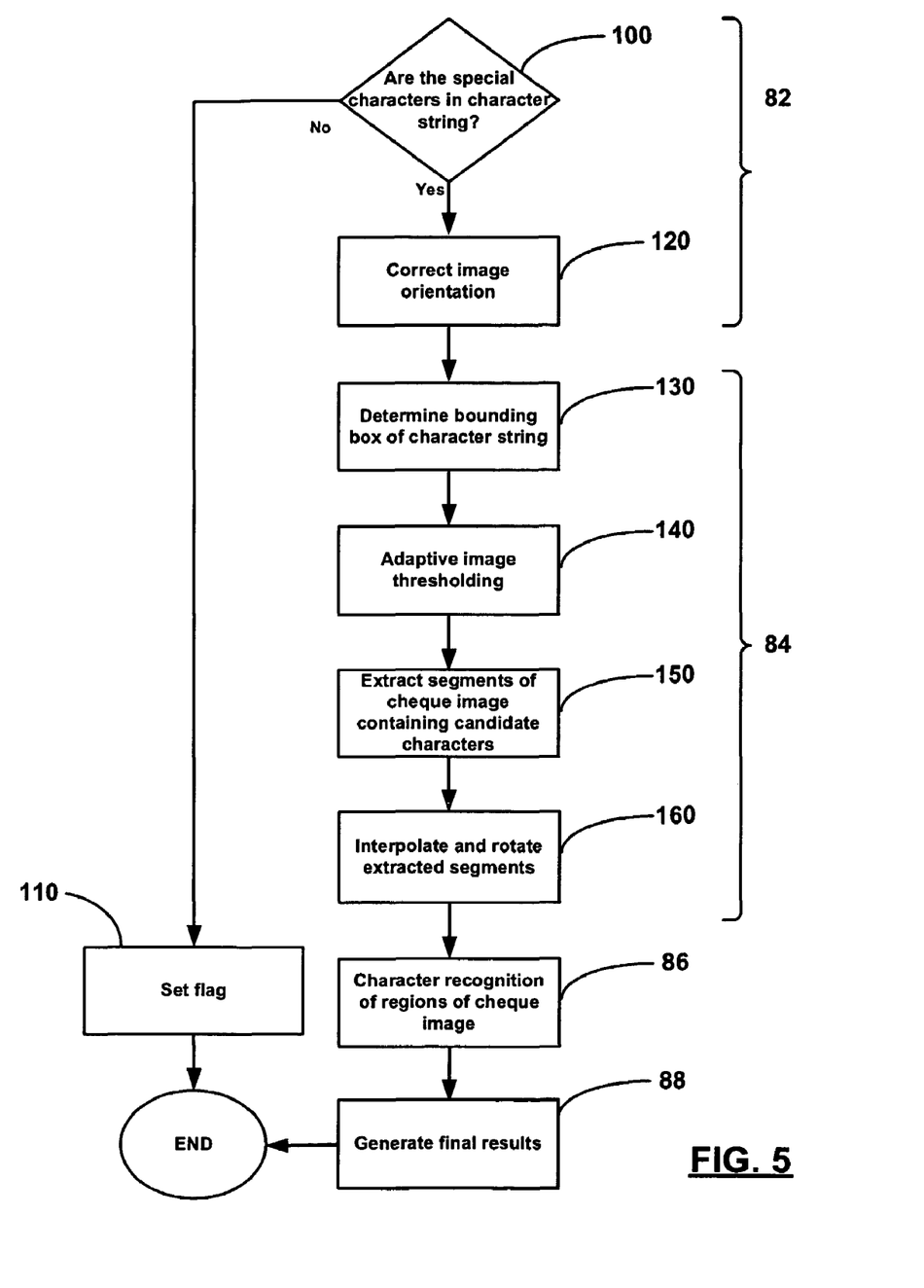
FIG. 5 is another flow chart showing the steps performed by the character recognition system of FIG. 1 in order to locate and recognize E13B characters in the account identification E13B character string printed on a cheque.

FIG. 5 further illustrates the steps performed during cheque processing. At step 80, a greyscale bitmap image of each cheque is either generated by the scanner 20 or uploaded from an information network 28 via the network interface 18. As mentioned previously, the account identification E13B character string 38 is vertically oriented in the cheque image as a result of the cheque orientation at the time of scanning.

At step 82, for each cheque image, the cheque image is examined to locate the special characters 62 in the account identification E13B character string 38 (step 100). If the special characters 62 cannot be located, a flag is set identifying the cheque image as being unreadable and cheque processing is terminated (step 110). If the special characters 62 are located in the account identification E13B character string, peaks corresponding to the special characters are generated and are used to orient the cheque image (step 120). During cheque image orientation at step 120, the cheque image is rotated until the two generated peaks are vertically aligned.

During isolation and extraction of the cheque image segments containing candidate E13B characters at step 84, a bounding box is determined that encompasses the account identification E13B character string 38 in the cheque image (step 130). The bounding box is determined by estimating the location of the limits of the account identification E13B character string 38 using the known size of the E13B characters and the assigned locations of the special characters 62 within the account identification E13B character string 38. The estimated limits are then expanded slightly to provide a margin around the account identification E13B character string 38 thereby to provide tolerance for error.

Once the bounding box encompassing the account identification E13B character string 38 has been determined at step 130, adaptive thresholding is performed on the portion of the cheque image that is encompassed or bound by the bounding box. As a result, the portion of the greyscale cheque image that is encompassed by the bounding box is converted to black and white (step 140). In particular, during the adaptive thresholding the average pixel intensity T of the cheque image portion encompassed by the bounding box is determined and is used as an initial threshold value. The cheque image portion encompassed by the bounding box is then partitioned into two groups based on the initial threshold value. The average grey pixel values $\mu_1$ and $\mu_2$ are determined for each of the two groups. A new threshold value is then calculated using the following formula:

$$T=(\mu_1+\mu_2)/2$$

The above steps are then repeated until the average grey pixel values $\mu_1$ and $\mu_2$ for each of the two groups do not change in two successive iterations.

Once the cheque image portion encompassed by the bounding box has been converted to black and white at step 140, segments of the cheque image portion that contain candidate E13B characters are extracted (step 150).

With the segments of the cheque image portion containing the candidate E13B characters extracted, the extracted segments are interpolated and rotated to suit the requirements of the neural network 26 (step 160). In this example, the extracted segments are rotated 90 degrees clockwise and are interpolated to a size of 19 by 24 pixels.

With the extracted segments containing candidate E13B characters interpolated and rotated, the neural network 26 is used to recognize the candidate E13B characters in the extracted segments (step 86). Following recognition of the E13B characters, at step 88 the recognized E13B characters are outputted to a database (step 88). The output can be the complete account identification E13B character string 38 or part of the account identification E13B character string 38. If one or more E13B characters in the account identification E13B character string 38 are unrecognizable, the output to the database may include information specifying the unrecognizable E13B characters in the account identification E13B character string and/or a pointer pointing to the segments of the cheque image containing the unrecognizable E13B characters.

Figure 6:
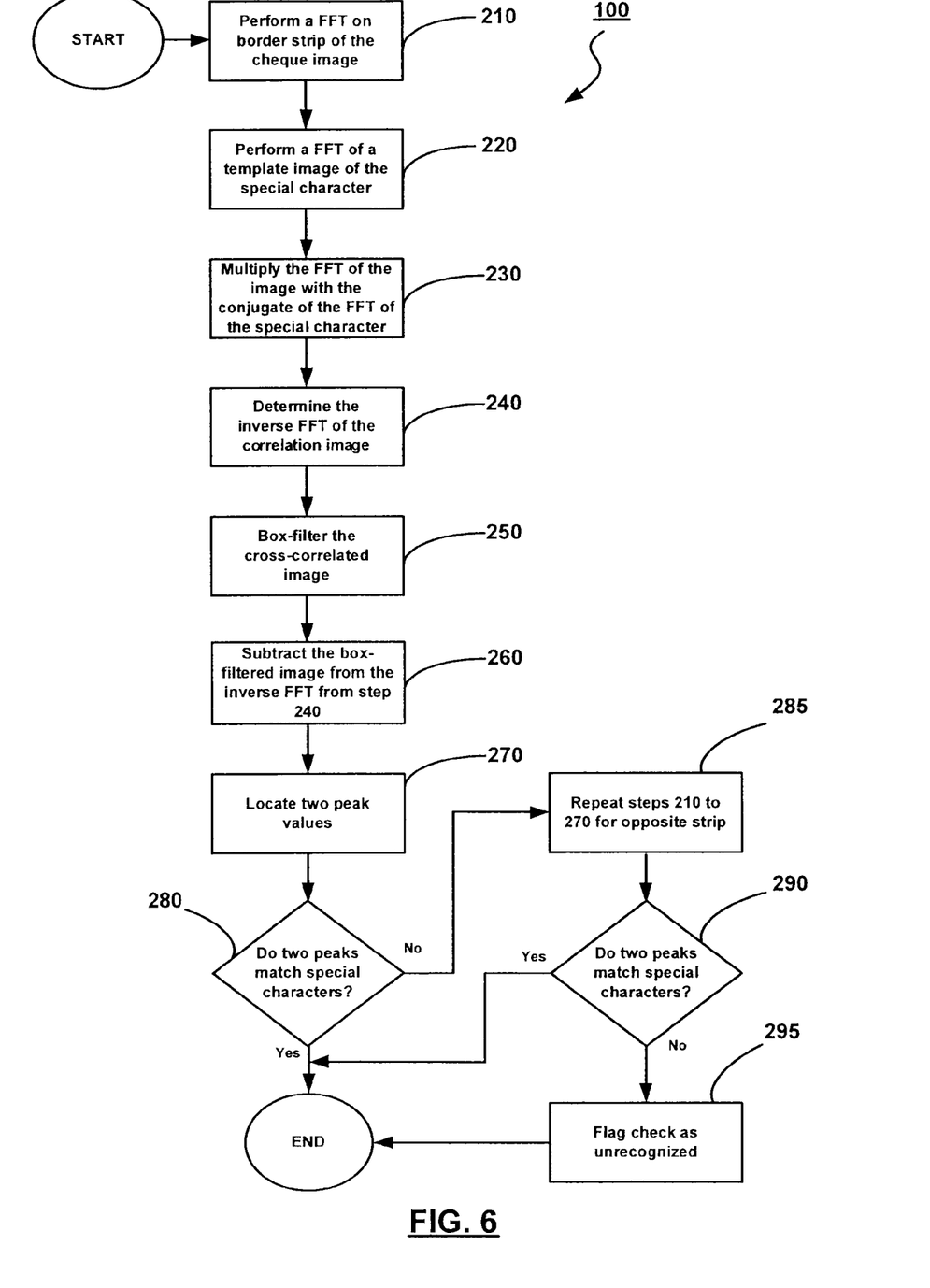
FIG. 6 is a flow chart showing the steps performed by the character recognition system of FIG. 1 in order to locate special characters in the account identification E13B character string.

The steps performed when locating the special characters 62 in the account identification E13B character string 38 are better illustrated in FIG. 6. Initially, a Fast Fourier Transform ("FFT") is performed on the border strip 40 of the cheque image (step 210). The border strip 40 has a width of ⅝" which has been found to be sufficiently wide to capture the account identification E13B character string 38 without introducing significant levels of noise from other features of the cheque.

An FFT is also performed on the E13B character template image corresponding to the special character 62 (step 220). This step is performed to subject the E13B character template image to the same processing applied to the cheque image to maintain consistency. Then, the transformed cheque image is multiplied with the conjugate of the transformed E13B character template image (step 230). The inverse FFT of the resultant correlation image generated at step 230 is determined (step 240), thus yielding an image representing the cross-correlation between the cheque image and the E13B character template image. Next, the cross-correlation image is box-filtered using a 5×5 averaging filter thereby to smooth the cross-correlation image (step 250). The box-filtered cross-correlation image is then subtracted from the inverse FFT of the cross-correlation image generated at step 240 (step 260). The two peak values in the resultant image, which should correspond to the special characters 62 in the account identification E13B character string 38, are then located (step 270). A determination is made as to whether the two peaks match the special characters 62 by performing a spatial analysis of the two peaks (step 280). As each special character 62 is of a known fixed size, (0.117" or approximately 8.4 points), confirmation of a match can be easily made. If the two peaks match the special characters 62, the peaks are confirmed and are used during cheque image alignment.

If the two peaks do not match the special characters 62, it is assumed that the cheque may have been scanned in the wrong orientation. In this case, steps 210 to 270 are repeated using a border strip running along the opposite side of the cheque image (step 285). The border strip from the opposite side is obtained by rotating the cheque image by 180 degrees. The border strip of the rotated cheque image is then processed according to steps 210 to 270 to locate the two peak values in the border strip (step 285). A determination is then made as to whether the two located peaks match the special characters 62 using the same spatial analysis method employed at step 280 (step 290). If the two peaks match the special characters 62, the peaks are confirmed and are used during cheque image alignment. If the two peaks do not match, a situation which generally arises due to excessive noise in the cheque image or missing special characters 62, the flag is set (step 295) identifying the cheque as being unreadable.

Figure 7:
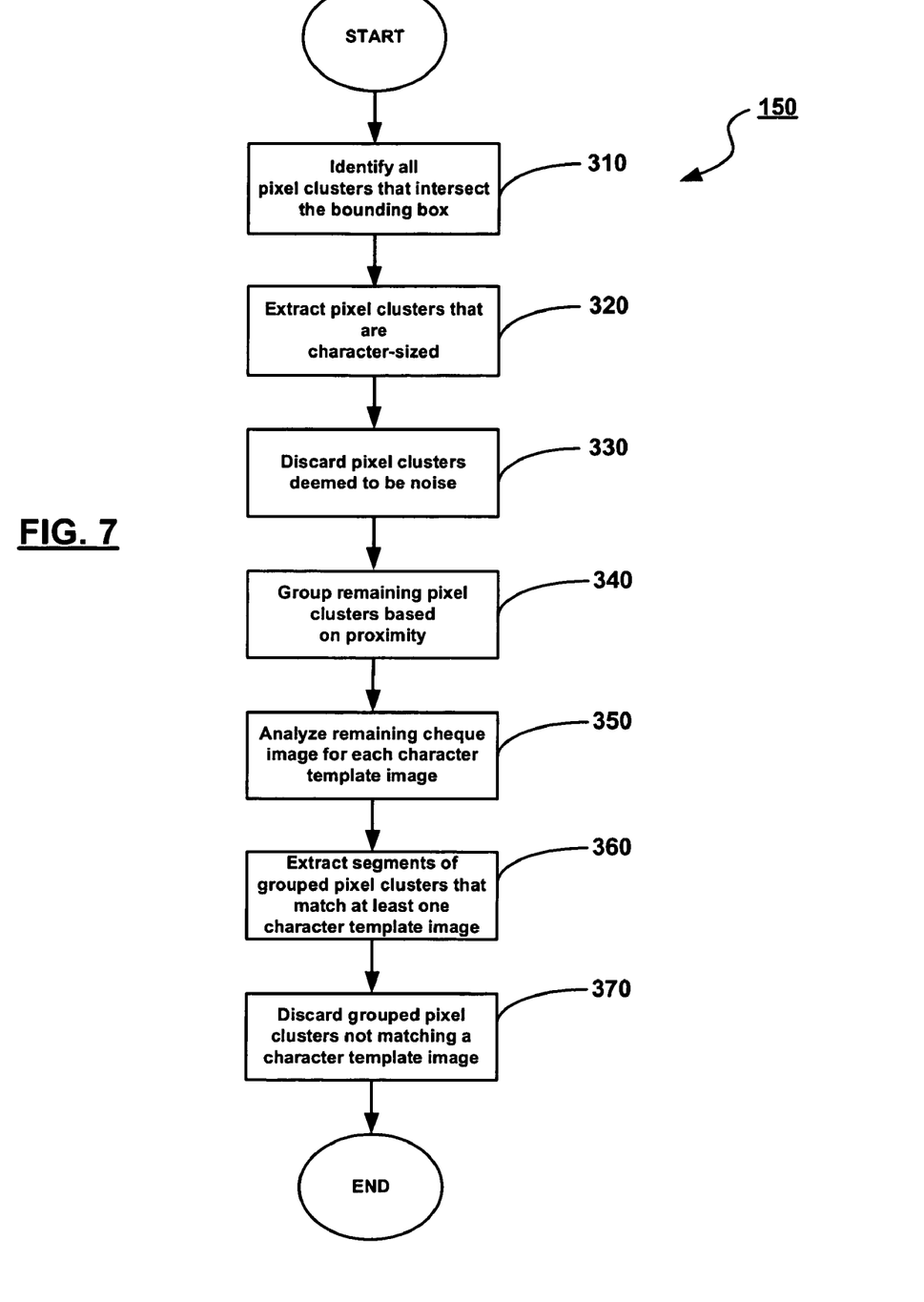
FIG. 7 is a flow chart showing the steps performed by the character recognition system of FIG. 1 during extraction of cheque image segments including candidate E13B characters.

FIG. 7 better illustrates the steps performed during extraction of cheque image segments including candidate E13B characters (step 150). After adaptive image thresholding has been performed at step 140, candidate pixel clusters in the cheque image portion encompassed by the bounding box are identified (step 310). In the present embodiment, candidate pixel clusters in the cheque image portion are black pixel clusters that include at least two interconnected black pixels. The identified candidate pixel clusters are then examined to determine if they are of a size corresponding to the known size of the E13B characters. That is, each candidate pixel cluster is examined to determine if it has a height between eight (8) and twenty-one (21) pixels and a width between twenty (20) and twenty-six (26) pixels. For each candidate pixel cluster satisfying this test, the segment of the cheque image portion in which the candidate pixel cluster lies is extracted (step 320). Extraction refers to the generation of a new image file containing only the segment of the cheque image portion encompassed by the bounding box including the candidate pixel cluster that is believed to represent a candidate E13B character. The extracted image segments including the candidate E13B characters are then stretched or reduced to make the extracted image segments equal in size to the E13B character template images. The regions of the cheque image portion encompassed by the bounding box corresponding to the extracted segments are also replaced with white pixels representing background.

Following step 320, all pixel clusters in the cheque image portion that are deemed to be noise are discarded (step 330). In the present embodiment, pixel clusters below a threshold minimum size, in this example pixel clusters having a height and width of five (5) pixels or less, are removed from the cheque image portion and are replaced with white pixels.

The remaining pixel clusters in the cheque image portion are then grouped based on proximity (step 340). Specifically, pixel clusters lying within a threshold distance from one another in the longitudinal direction of the character string 38 are grouped.

Then using a sliding window pixel comparison technique, each pixel cluster group in the cheque image portion is compared to each of the E13B character template images (step 350). The comparisons yield a set of correlation results for each pixel cluster group with each correlation result being stored in a spatial correlation bitmap image.

The segment of the cheque image portion corresponding to each pixel cluster group having a correlation result in its associated set that is above a minimum desired strength is determined. For each determined segment, pixels common to both the pixel cluster group and the E13B character template image are then extracted (step 360). To determine the above, in the present embodiment, the spatial correlation bitmaps including the correlation results for each pixel cluster group are individually searched to determine if one or more of the correlation results has a value of one hundred and ten (110) or more out of two-hundred and fifty-five (255).

Pixel cluster groups that do not have a correlation result in their associated sets above the minimum desired strength are flagged as being unrecognizable and are discarded (step 370).

Figure 8:
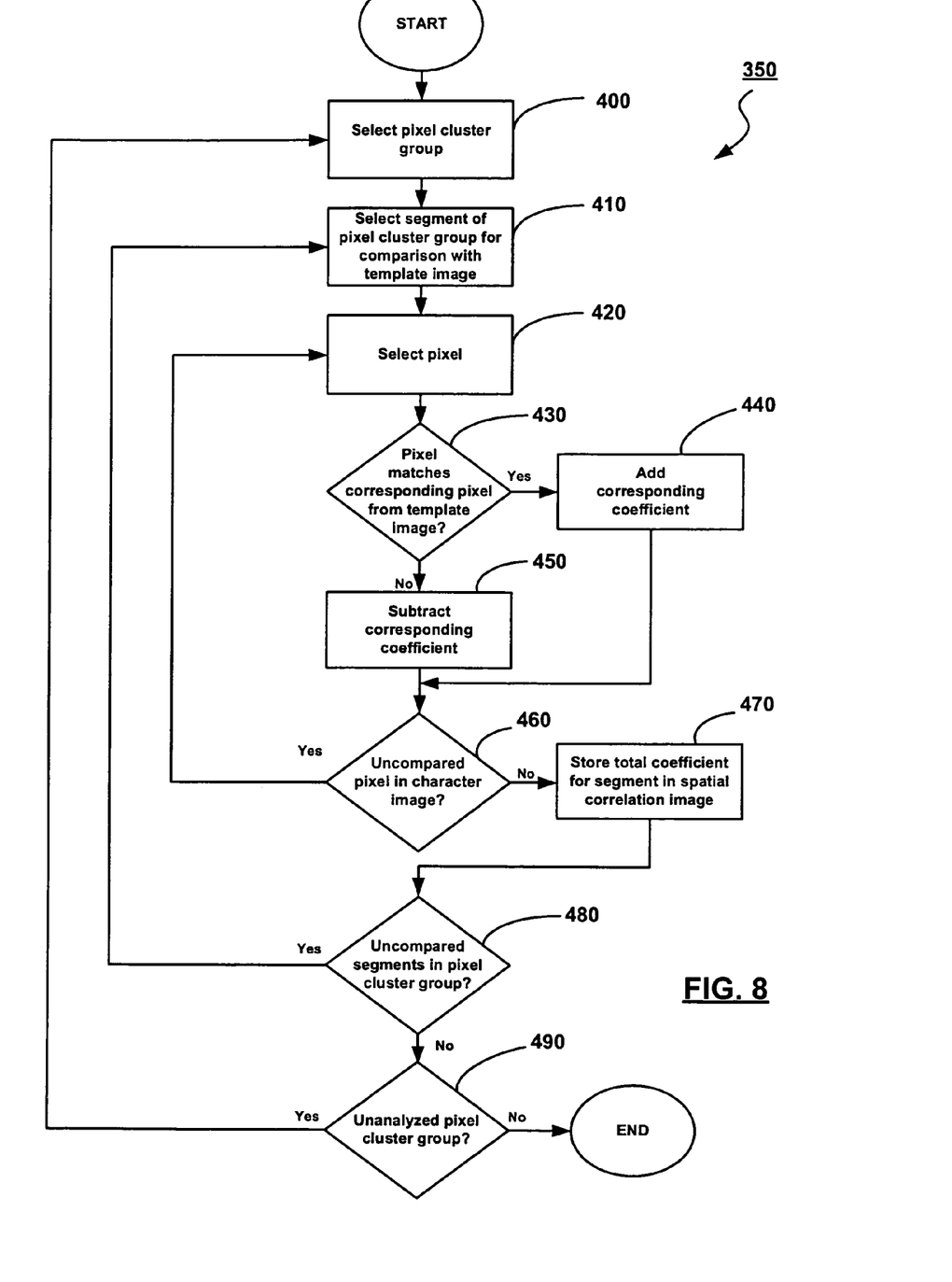
FIG. 8 is a flow chart showing further steps performed by the character recognition system of FIG. 1 during extraction of cheque image segments including candidate E13B characters.

FIG. 8 illustrates the steps performed during comparison of the cheque image portion including one or more pixel cluster groups with each of the E13B character template images (step 350). Initially, a pixel cluster group is selected (step 400). A rectangular segment of the selected pixel cluster group having a size corresponding to that of the E13B character template images that mates with the top-left border of the selected pixel cluster group is then selected (step 410). Then, a first pixel of the selected segment is chosen and compared to the corresponding pixel of the selected E13B character template image (step 420). In the present embodiment, the first pixel of the selected segment is positioned at the top-left corner of the selected segment. A determination is then made as to whether the chosen pixel of the selected segment matches the corresponding pixel of the selected E13B character template image (step 430).

If the pixels match, a coefficient associated with the corresponding pixel of the selected E13B character template image is added to a correlation result for the selected segment (step 440). The coefficient is selected from a coefficient bitmap defined for each E13B character template image. The coefficients in the coefficient bitmap represent the level of importance of each pixel in the E13B character template image. Coefficients corresponding to pixels of the E13B character template image that form the contour of the E13B character and delineate the E13B character from its background are given greater importance; i.e., are relatively high in relation to other coefficients. The pixels deemed to make up the contour include both black foreground pixels forming the perimeter of the E13B character and white background pixels adjacent the perimeter of the E13B character. It has been found that, by placing greater emphasis on pixels making up the contour of the E13B character, noise has less impact overall on the identification and extraction of candidate E13B characters in the cheque image portion.

At step 430, if the pixels do not match, the coefficient corresponding to the pixel of the E13B character template image is subtracted from the correlation result for the selected segment (step 450).

A determination is then made as to whether there remain any uncompared pixels in the same pixel row of the selected segment (step 460). If uncompared pixels exists, the next pixel in the same pixel row of the selected segment is chosen and above steps 420 to 460 are performed. This process continues until each pixel in the first pixel row of the selected segment has been compared to its corresponding pixel row of the selected E13B character template image. Once the pixels in the first row of the selected segment have been processed, the remaining rows of pixels of the selected segment are processed in a similar fashion.

Once all of the pixels of the selected segment have been compared to their corresponding pixels of the selected E13B character template image, the total correlation result is stored in the spatial correlation bitmap image associated with the selected E13B character template image at the corresponding location of the selected segment (step 470).

After the total correlation result for the selected segment and selected E13B character template image has been generated and stored, a determination is made as to whether any other segments of the selected pixel cluster group exist that have not been compared to the selected E13B character template image (step 480). If so another segment of the selected pixel cluster group is selected by shifting the previously selected segment one pixel to the right. Steps 410 to 460 are then performed for the pixel rows of the newly selected segment. This process continues until the selected segment reaches the top right border of the selected pixel cluster group. When this occurs, the selected segment is shifted down by one pixel and the above process is repeated moving the selected segment back across the selected pixel cluster group. This reversing sliding window pixel comparison technique continues until every pixel in the selected pixel cluster group has formed part of at least one selected segment.

As will be appreciated, steps 410 to 480 are performed for each E13B character template image. As a result, fourteen (14) spatial correlation bitmap images are generated for each selected pixel cluster group, with each spatial correlation bitmap image being associated with a different E13B character template image.

When all of the segments for the selected pixel cluster group have been compared to each of the E13B character template images, a determination is made as to whether any other pixel cluster groups exist (step 490). If so, steps 400 to 480 are performed for each of these other pixel cluster groups.

Figure 9:
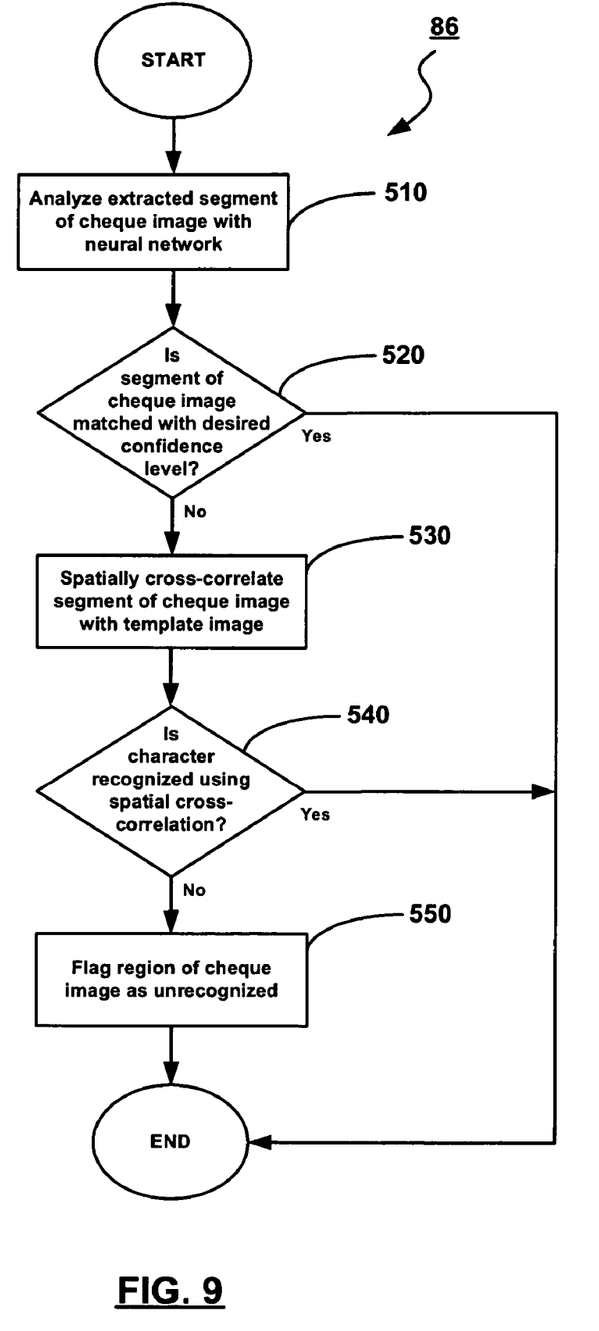
FIG. 9 is a flow chart showing the steps performed by the character recognition system of FIG. 1 during E13B character recognition.

FIG. 9 best illustrates the steps performed during character recognition (step 86). Once the processing unit 12 has extracted the segments of the cheque image portion containing candidate E13B characters, the extracted segments are analyzed using the neural network 26 (step 510). During analysis of the extracted segments, a determination is made as to whether the candidate E13B character in each extracted segment matches one or more E13B characters in the set with a desired confidence level (step 520). In general, when the extracted segment and the neural network training are of high quality, the neural network 26 will typically match the candidate E13B character in the extracted segment to a single E13B character. Where the quality of the extracted segment and/or the neural network training is poor, the neural network 26 may match the candidate E13B character in the extracted segment to two or more E13B characters.

If the neural network 26 matches the candidate E13B character in the extracted segment to a single E13B character, the candidate E13B character is deemed to be recognized. If the neural network 26 matches the candidate E13B character in the segment to more than one E13B characters, a spatial correlation is performed on the extracted segment and the E13B character template images identified by the neural network 26 as being possible matches (step 530). During the correlation, the extracted segment is compared, pixel by pixel, to each of the E13B character template images identified as being possible matches. When compared pixels match, the coefficient from the coefficient bitmap corresponding to the pixel of the E13B character template image is added to a correlation result. When compared pixels do not match, the coefficient from the coefficient bitmap corresponding to the pixel of the E13B character template image is subtracted from the correlation result.

Once a correlation result for each of the possible E13B character matches is generated, the correlation results are used to determine whether the candidate E13B character has been recognized (step 540). In particular, if one of the correlation results clearly establishes that the candidate E13B character matches one of the E13B character template images significantly better than the other E13B character template images, the candidate E13B character is deemed to correspond to that E13B character and hence is recognized. If however, none of the correlation results clearly establishes that the candidate E13B character matches one of the E13B character template images significantly better than the other E13B character template images, the candidate E13B character is flagged as being unrecognized (step 550).

The present character recognition system 10 has been found to recognize the account identification E13B character strings on clean cheques having an average of twenty-five (25) E13B characters per cheque with 99% accuracy. In particular, it has been observed that the character recognition system 10 recognizes all E13B characters with 99.96% accuracy. The average time taken to process a cheque image is approximately 1.6 seconds.

Although the present invention has been described with particular reference to E13B character recognition on cheques, those of skill in the art will appreciate that the character recognition system 10 may be used to identify other character fonts printed on cheques or other substrates as well as hand-written characters applied to substrates. While some fonts are better suited for recognition, those of skill in the art will appreciate that distinguishing features of characters of any font can be weighted with greater significance to assist in character recognition. For example, generally the character corresponding to the ASCII number "3" is comprised of two unclosed loops and the character corresponding to the ASCII number "8" is comprised of two closed loops. Higher coefficients for the pixels of the character template image representing the ASCII number "3" corresponding to the missing left loop portions allow for better differentiation between the two otherwise-similar characters.

While the correlation results used are disclosed as being equal to the sum of the coefficients associated with matching pixels less the sum of the coefficients associated with non-matching pixels, those of skill in the art will appreciate that other formulae can be employed to determine the correlation between the extracted segments of the cheque image portion and the E13B character template images.

Greyscale and colour images can also be processed when an appropriate form of thresholding is employed to distinguish background from foreground.

Although preferred embodiments of the present invention have been described, those of skill in the art will appreciate that variations and modifications may be made without departing from the spirit and scope thereof as defined by the appended claims.

What is claimed is:

1. A method of identifying candidate characters of a character string in a captured image, the method comprising using a processor to perform the steps of:

identifying special characters within the captured image of said character string, including:
   performing a Fast Fourier Transform (FFT) on a portion of the captured image;
   performing an inverse FFT yielding a cross-correlation image representing a cross-correlation between the captured image and a character template image corresponding to the special characters;
   box-filtering the cross-correlation image to smooth the cross-correlation image;
   subtracting the box-filtered image from the cross-correlation image yielding a modified cross-correlation image; and
   based at least in part on the modified cross-correlation image, identifying the special characters;
   determining a bounding box generally encompassing said character string based on the identified special characters;
   determining segments of said bounding box containing candidate characters;
   comparing each determined segment of said bounding box with at least one character template image, each character template image including features associated with a respective character to be recognized; and
   identifying a candidate character when said segment includes image information corresponding to one of a set of character template images.

2. The method of claim 1, wherein each determined segment is compared with a plurality of character template images and wherein said features in each character template image include contours of the respective character.

3. The method of claim 2, wherein said contours include pixels forming the outline of said respective character and background pixels adjacent to the outline pixels.

4. The method of claim 2, wherein each character template image has an associated coefficient map assigning coefficients to each pixel in said character template image, coefficients corresponding to pixels of said contour being weighted differently than other pixels in said character template image, during said comparing, pixels of each determined segment being compared with corresponding pixels of each character template image and a correlation result being generated using said coefficients, said correlation result representing the degree of likelihood said segment includes a candidate character represented by a character template image, each correlation result satisfying a threshold being used to identify the segment as potentially including a candidate character represented by the character template image associated with the coefficients used to generate that correlation result.

5. The method of claim 4, wherein the pixels of said contour are weighted higher than other pixels.

6. The method of claim 5, wherein each correlation result above said threshold is used during the identifying.

7. The method of claim 6, wherein each correlation result is generated by summing coefficients assigned to pixels in the character template image that match corresponding pixels in the segment.

8. The method of claim 7, wherein coefficients assigned to pixels in the character template image that do not match corresponding pixels in the segment are subtracted from the summed coefficients.

9. The method of claim 2, wherein said character is an E13B character.

10. The method of claim 9 wherein said captured image is an image of a cheque, wherein said each segment contains an E13B character and wherein said character string is an account identification E13B character string on said cheque.

11. The method of claim 10, wherein said contours include pixels forming the outline of said respective character and background pixels adjacent to the outline pixels.

12. The method of claim 11, wherein each character template image includes a coefficient map assigning coefficients to each pixel in said character template image, coefficients corresponding to pixels of said contour being weighted differently than other pixels in said character template image, during said comparing, pixels of each determined segment being compared with corresponding pixels of each character template image and a correlation result being generated using said coefficients representing the degree of likelihood said segment includes a candidate character represented by a character template image, each correlation result satisfying a threshold being used to identify the segment as potentially including the character represented by the character template image associated with the coefficients used to generate that correlation result.

13. The method of claim 12 wherein pixels of said contours are weighted higher than other pixels and wherein each correlation result above the threshold is used during the identifying.

14. The method of claim 13 wherein each correlation result is generated by summing coefficients assigned to pixels in the character template image that match corresponding pixels in the segment and by subtracting coefficients assigned to pixels in the character template image that do not match corresponding pixels in the segment.

15. The method of claim 10 wherein said comparing and identifying is performed for each segment of said cheque that encompasses a candidate E13B character in said account identification E13B character string.

16. The method of claim 15 further comprising examining each identified segment to recognize the candidate E13B character encompassed thereby.

17. The method of claim 16 wherein said examining is performed using a trained neural network.

18. The method of claim 2 further comprising the step of examining each identified segment to recognize said candidate character.

19. The method of claim 18 wherein said examining is performed using a trained neural network.

20. The method of claim 19, wherein each character template image includes a coefficient map assigning coefficients to each pixel in said character template image, coefficients corresponding to pixels of said contour being weighted differently than other pixels in said character template image, during said comparing, pixels of each determined segment being compared with corresponding pixels of each character template image and a correlation result being generated using said coefficients representing the degree of likelihood said segment includes a candidate character represented by a character template image, each correlation result satisfying a threshold being used to identify the segment as potentially including the character represented by the character template image associated with the coefficients used to generate that correlation result.

21. The method of claim 20 wherein pixels of said contours are weighted higher than other pixels and wherein each correlation result above the threshold is used during the identifying.

22. The method of claim 21 wherein each correlation result is generated by summing coefficients assigned to pixels in the character template image that match corresponding pixels in the segment and by subtracting coefficients assigned to pixels in the character template image that do not match corresponding pixels in the segment.

23. The method of claim 1, wherein the location of the special characters is used to determine the bounding box generally encompassing said character string by estimating the location of the limits of the character string using the locations of the special characters and using a known size of characters of the character string.

24. The method of claim 1, wherein identifying special characters of said character string further includes performing a FFT on the character template image corresponding to the special characters.

25. The method of claim 24, wherein identifying special characters of said character string further includes:
locating two peak values in an image resulting from the subtraction of the box-filtered image from the inverse FFT of the cross-correlation image;
performing a spatial analysis of the two peak values; and
confirming that the peaks match the special characters based on the spatial analysis of the two peak values.

26. A method of recognizing characters of a character string in an image, comprising using a processor to perform the steps of:
identifying designated characters of said character string comprising:
performing a Fast Fourier Transform (FFT) on a portion of the captured image;
performing an inverse FFT yielding a cross-correlation image representing a cross-correlation between the captured image and a character template image corresponding to the designated characters;
box-filtering the cross-correlation image to smooth the cross-correlation image;
subtracting the box-filtered image from the cross-correlation image yielding a modified cross-correlation image; and
based at least in part on the modified cross-correlation image, identifying the designated characters;
using the location of the designated characters to determine a bounding box generally encompassing said character string;
determining segments of said bounding box containing candidate characters;
performing character recognition using a neural network by comparing each determined segment of said image containing a candidate character to be recognized with a plurality of character template images representing recognizable characters;
when the candidate character of a determined segment corresponds to one of said character template images, recognizing the candidate character as that represented by said one character template image; and
when the candidate character of a determined segment corresponds to a plurality of said character template images, using a correlation between the determined segment and each character template image of the plurality to recognize the candidate character as that represented by one character template image of said plurality.

27. The method of claim 26 wherein the correlation representing the character template image of the plurality that is deemed most likely to represent the candidate character encompassed by the determined segment is used.

28. The method of claim 27 wherein the candidate character is not recognized when the correlations are below a threshold strength.

29. The method of claim 28 wherein the characters are E13B characters.

* * * * *

UNITED STATES PATENT AND TRADEMARK OFFICE
CERTIFICATE OF CORRECTION

PATENT NO.       : 7,590,275 B2
APPLICATION NO. : 10/926658
DATED            : September 15, 2009
INVENTOR(S)      : Clarke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Twenty-first Day of September, 2010

David J. Kappos
*Director of the United States Patent and Trademark Office*